(12) United States Patent
Kim et al.

(10) Patent No.: US 7,623,577 B2
(45) Date of Patent: Nov. 24, 2009

(54) METHOD AND APPARATUS FOR VIDEO DEBLOCKING

(75) Inventors: Changick Kim, Yuseong-gu (KR); Joseph Shu, San Jose, CA (US)

(73) Assignee: Seiko Epson Corporation

( * ) Notice: Subject to any disclaimer, the term of this patent is extended or adjusted under 35 U.S.C. 154(b) by 678 days.

(21) Appl. No.: 11/344,252

(22) Filed: Jan. 31, 2006

(65) Prior Publication Data

US 2006/0126731 A1    Jun. 15, 2006

Related U.S. Application Data

(62) Division of application No. 10/247,942, filed on Sep. 20, 2002, now Pat. No. 7,031,392.

(51) Int. Cl.
    *H04N 7/12* (2006.01)
(52) U.S. Cl. ................................. 375/240.29
(58) Field of Classification Search ............ 375/240.01, 375/240.03, 240.24, 240.26, 240.29; *H04N 7/12*
    See application file for complete search history.

(56) References Cited

U.S. PATENT DOCUMENTS

| 5,107,348 | A | 4/1992 | Citta et al. |
|---|---|---|---|
| 5,454,051 | A | 9/1995 | Smith |
| 5,883,983 | A | 3/1999 | Lee et al. |
| 5,917,471 | A | 6/1999 | Choi |
| 5,937,101 | A | 8/1999 | Jeon et al. |
| 5,974,197 | A | 10/1999 | Lee et al. |
| 6,028,967 | A | 2/2000 | Kim et al. |
| 6,035,060 | A | 3/2000 | Chen et al. |
| 6,064,359 | A | 5/2000 | Lin et al. |
| 6,115,503 | A | 9/2000 | Kaup |
| 6,141,380 | A | 10/2000 | Krishnamurthy et al. |
| 6,151,420 | A | 11/2000 | Wober et al. |
| 6,167,164 | A | 12/2000 | Lee |
| 6,188,799 | B1 | 2/2001 | Tan et al. |

(Continued)

FOREIGN PATENT DOCUMENTS

EP        0 575 202        12/1993

(Continued)

OTHER PUBLICATIONS

Hiroshi Fujiwara, et al., "An All-ASIC Implementation Of A Low Bit-Rate Video Codec"*IEEE* Transactions on Circuits And Systems For Video Technology, vol. 2, No. 2, Jun. 1992, , pp. 123-134.

(Continued)

*Primary Examiner*—Young Lee

(57) ABSTRACT

A method for smoothing artificial discontinuities between image blocks associated with digital data comprises reconstructing a block-based pixel representation of image blocks associated with digital data. If the difference between adjacent image blocks of the block-based pixel representation is less than or equal to a quantization parameter, then the method includes modifying boundary pixel values to define at least one additional frame, and displaying the at least one additional frame and an original frame in an alternating fashion so as to visually achieve smooth block boundaries between the adjacent image blocks. The method may be performed by a suitable device and/or may be embodied in an instruction set executable by such device.

5 Claims, 8 Drawing Sheets

U.S. PATENT DOCUMENTS

| | | |
|---|---|---|
| 6,226,050 B1 | 5/2001 | Lee |
| 6,229,929 B1 | 5/2001 | Lynch et al. |
| 6,240,135 B1 | 5/2001 | Kim |
| 6,285,801 B1 | 9/2001 | Mancuso et al. |
| 6,335,990 B1 | 1/2002 | Chen et al. |
| 2001/0003545 A1 | 6/2001 | Hong |
| 2001/0019634 A1 | 9/2001 | Lainema et al. |

FOREIGN PATENT DOCUMENTS

| | | |
|---|---|---|
| WO | WO 00/33254 | 6/2000 |

OTHER PUBLICATIONS

Schoyer, M. K. N., et al., "Block Position Dithering in DCT-Coded Sequences", Signal Processing, Image Communication, Elsevier Science Publishers, Amsterdam, NL, vol. 8, No. 6, Sep. 1, 1996, XP004047116, pp. 545-549, paragraph 3.

"LCD Color Palette Generation", Sharp Application Note, SMT95013, 1995, XP002281237, pp. 1-8.

Li Yan, "A Nonlinear Algorithm for Enhancing Low Bit-Rate Coded Motion Video Sequence", Proceedings of the International Conference on Image Processing (ICIP) Austin, Nov. 13-16, 1994, Los Alamitos, *IEEE* Comp. Soc. Press, US, vol. 3 Conf. 1, Nov. 13, 1994, pp. 923-927.

METHOD AND APPARATUS FOR VIDEO DEBLOCKING

CONTINUING APPLICATION DATA

This application is a divisional of U.S. patent application Ser. No. 10/247,942, filed Sep. 20, 2002, the contents of which is incorporated by reference herein in its entirety.

BACKGROUND OF THE INVENTION

1. Field of the Invention

This invention relates generally to digital video technology and more particularly to algorithms for smoothing artificial discontinuities between adjacent image blocks, generated by low bit-rate video coding, without introducing undesired blur.

2. Description of the Related Art

Today's low-bit-rate video coding standards, such as MPEG-4, ITU-T H.263, etc. contain algorithms that enable a variety of applications, such as video conferencing and video phones. These standards, and the systems that use them, take advantage of temporal redundancy as well as spatial redundancy to compress the video data. While these standards are quite effective in many ways, the standards sometimes generate decompressed images that exhibit artificial discontinuities between image blocks, also referred to as blocking artifacts. These blocking artifacts are caused primarily by quantization during the quantization step of the compression process.

FIG. 1 is a simplified schematic that pictorially represents a blocking artifact associated with image data. Here, a frame of data $f_n$ includes boundary 102 located between block 1 and block 2 of the frame of image data. Block 1 includes pixel a and pixel b, while block 2 includes pixel c and pixel d. Line 100 denotes the pixel values for pixels c and d relative to pixels a and b. For example, line 100 may represent that pixels c and d correspond to a value of 1, while pixels a and b correspond to a value of 0. Accordingly, the decoded video will have a blocky effect at boundary 102 between block 1 and 2. FIG. 2 is a graphical representation of the original intensities compared to the distortion of the original intensities due to a blocky effect. The original intensities display a gradual and smooth increase across boundary 102 rather than an abrupt transition. However, due to the truncation of the high frequency coefficients by quantization, a blocky effect is observed in the decompressed image.

In block-based coding, monotone areas of the original image, where the pixel intensity changes gradually, suffer most noticeably from the abrupt changes across the block boundary, leading to blocking artifacts. In terms of discrete cosine transform (DCT), when the DCT coefficient quantization step size is above the threshold for visibility, discontinuities in grayscale values are caused by the removal of AC coefficients due to quantization. These discontinuities become clearly visible at the boundaries between blocks of a frame of the video image.

Various deblocking schemes have been proposed in still image coding as well as video coding, where most of the deblocking schemes use low pass filters in the spatial domain. A well-known method for reducing blocking artifacts is based on the theory of alternative projection onto convex sets (POCS), under the assumption that blocking artifacts are always located at block boundaries. However, this method is only applicable to still images because of an iteration structure and long convergence time.

In video coding, in order to maintain a specified bit rate, a proper quantization of the transformed coefficients must be performed. As a result of the quantization, the blocky effect appears in the reconstructed images. This artifact can be strongly visible and as such, severely degrades the image quality. One attempt to improve the image quality is to apply post-processing steps to the decoded video data, such as low pass filters applied to the spatial domain. However, one short coming with current post-processing steps is their computational complexity, which requires about 30-40% of the total computational power needed in the receiver. It should be appreciated that this type of power drain is unacceptably high for mobile terminals, i.e., battery enabled consumer electronics, such as terminals incorporating thin film transistors (TFT) technology, super-twisted nematic (STN), and mobile digital-thin film diode (MD-TFD). Another shortcoming of the low pass filters currently being used is that the amount of time for the filtering operation may cause a noticeable delay in the presentation of the image. This delay is especially noticeable with respect to portable electronic computing systems due to the limited resources of the embedded systems controlling these devices.

As a result, there is a need to solve the problems of the prior art and to provide a method and apparatus for enabling a post-processing algorithm for real-time applications that reduces the blocky artifact more efficiently from both a power and a time standpoint.

SUMMARY OF THE INVENTION

Broadly speaking, the present invention fills these needs by providing a method and system for reducing blocking artifacts through adaptive non-linear filtering based on local characteristics. It should be appreciated that the present invention can be implemented in numerous ways, including as a method, a system, or a device. Several inventive embodiments of the present invention are described below.

In one embodiment, a method for smoothing artificial discontinuities between image blocks associated with digital data is provided. The method initiates with reconstructing a block-based pixel representation of image blocks associated with digital data. Then, it is determined if a difference between adjacent image blocks of the block-based pixel representation is less than or equal to a quantization parameter. If the difference between adjacent image blocks of the block-based pixel representation is less than or equal to a quantization parameter, then the method includes modifying boundary pixel values to define at least one additional frame, and then displaying the at least one additional frame and an original frame in an alternating fashion so as to achieve smooth block boundaries, which has visually the same effect as spatial averaging.

In another embodiment, a frame rate modulation method for filtering discontinuities at a boundary between adjacent blocks of a frame of a video image is provided. The method initiates with identifying adjacent pixels located on each side of a boundary between adjacent blocks of a first frame of a video image. Each of the adjacent pixels is associated with a pixel value. Then, a difference between the adjacent blocks is determined. If a difference between adjacent image blocks of the first frame is less than or equal to a quantization parameter, then the method includes defining a second frame having the pixel value for each of the adjacent pixels swapped, and then averaging the pixel value associated with each adjacent pixel by alternately displaying the pixel value associated with each adjacent pixel to present an image having a smoothed block boundary.

In other embodiments, either or both of the above-described methods may be specified by a set of instructions embodied on a device-readable medium, e.g., a computer. Upon execution of a set of such instructions by the device the corresponding method is performed.

Other aspects and advantages of the invention will become apparent from the following detailed description, taken in conjunction with the accompanying drawings, illustrating, by way of example, the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
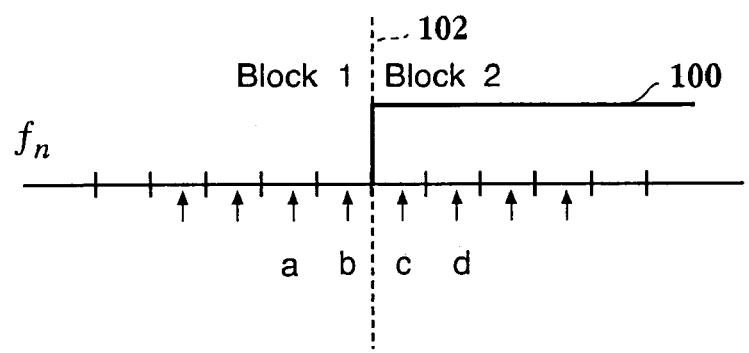
FIG. 1 is a one-dimensional illustration that pictorially represents a blocking artifact associated with image data.
Figure 2:
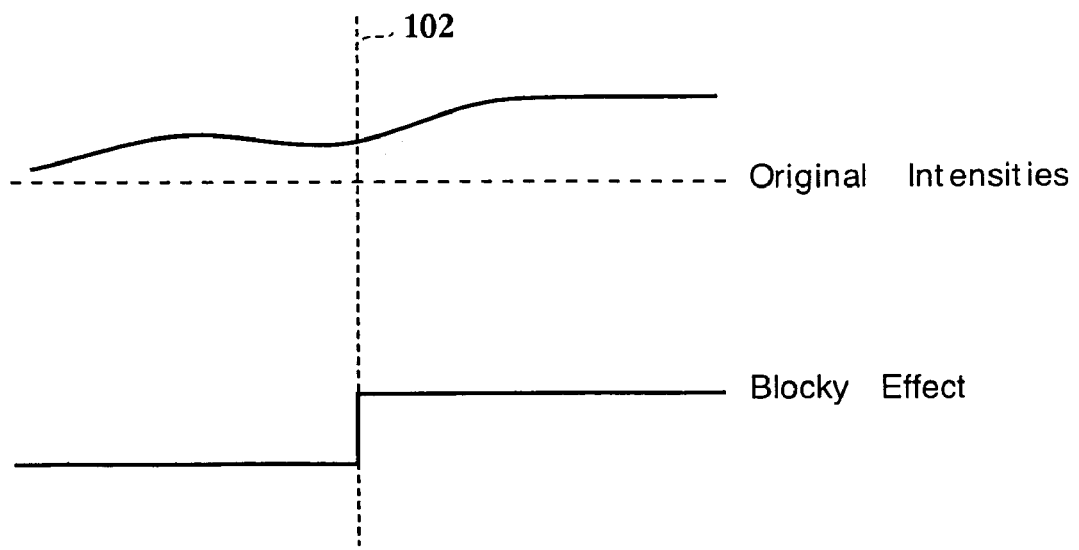
FIG. 2 is a graphical representation of the original intensities compared to the representation of the decompressed image.

An invention is described for an apparatus and method for smoothing discontinuities at block boundaries of a frame of image data. It will be obvious, however, to one skilled in the art, that the present invention may be practiced without some or all of these specific details. In other instances, well known process operations have not been described in detail in order not to unnecessarily obscure the present invention. FIGS. 1 and 2 are described in the "Background of the Invention" section.

The embodiments of the present invention provide an algorithm for smoothing artificial discontinuities between image blocks (blocking artifacts), without introducing undesired blur. As will be explained further below, the invention can be embodied in an apparatus, methods or programs of instructions. The embodiments of the invention are described with respect to low-bit-rate video coding applications, however, it should be appreciated that the embodiments can be applied to any suitable video coding application.

In one embodiment, frame rate modulation is used to smooth blocking artifacts between image blocks. As is generally known, a frame rate is the frequency at which the screen, such as a flat panel display, is refreshed. Typically, the most commonly used flat panel displays for portable devices are Super-twisted Neumatic (STN) Liquid Crystal Display (LCD) panels, whose response time is on the order of hundreds of milliseconds. As a consequence of the response time of such a slow panel being greater than the frame rate period, i.e., the refresh rate period for these panels is typically around 16 milliseconds (ms). Accordingly, frame rate modulation as described herein, takes advantage of this difference of the STN LCD panels to increase the number of displayed gray shades in one embodiment of the invention. In another embodiment, to display a pixel which has a gray shade equal to 0.5, the pixel is energized every other frame, i.e., 2 frames are needed where each pixel is turned on once in an alternating fashion. In other words, the pixel is shown every other frame to provide the appearance of a gray shade equal to 50% of the pixel brightness when the pixel is in a constant on state.

Figure 3:
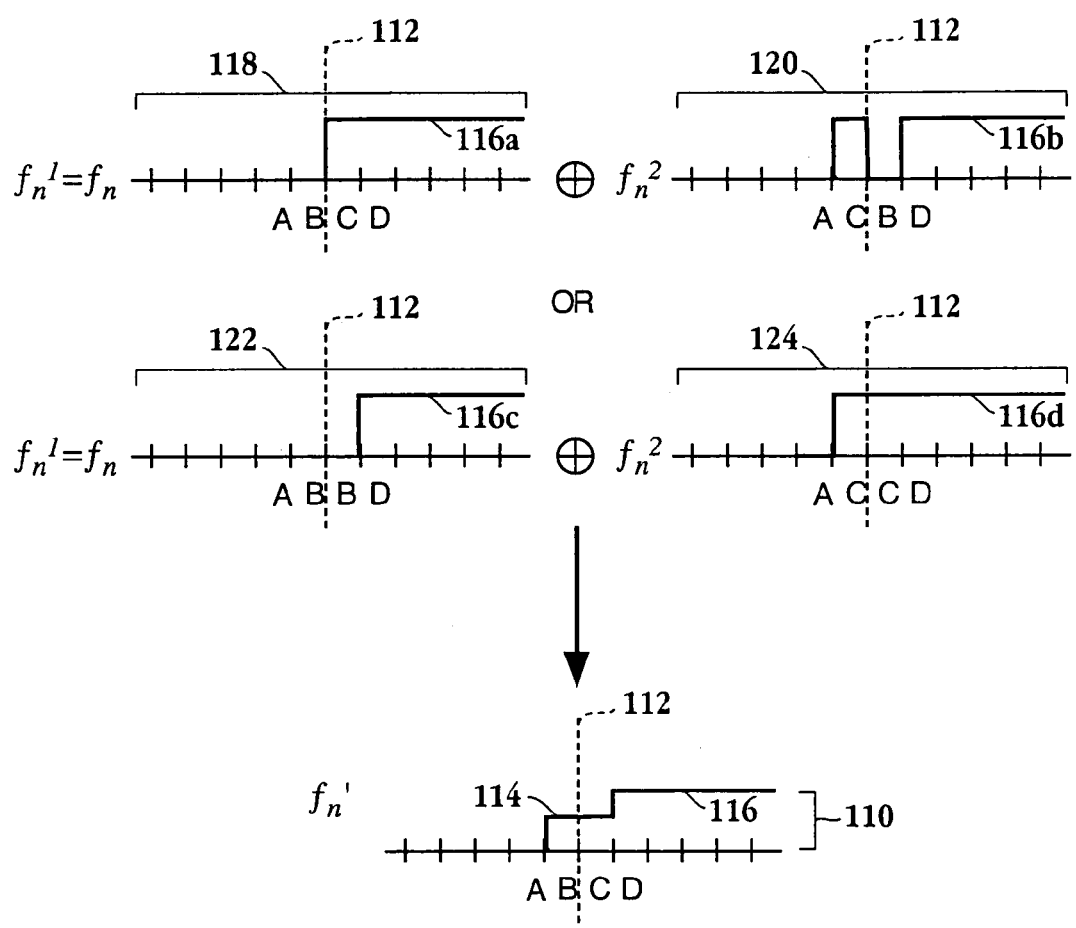
FIG. 3 is a simplified schematic diagram representing alternative modes of achieving the smoothing of block discontinuities between adjacent blocks of a video image in accordance with one embodiment of the invention.

FIG. 3 is a simplified schematic diagram representing alternative modes of achieving the smoothing of block discontinuities between adjacent blocks of a video image in accordance with one embodiment of the invention. One-dimensional representation 110 represents the results of averaging adjacent pixel values at boundary 112. Thus, one-dimensional representation 118 is an initial frame $f_n$ where block boundary 112 corresponds with a change in pixel values as represented by line 116a. From initial frame 118, additional frame $f_n^2$ is defined, as represented in schematic 120. Frame $f_n^2$ 120 is similar to initial frame $f_n$ 118 with the exception that the pixel values for pixel position B and pixel position C of frame $f_n$ 118 have been swapped in frame $f_n^2$ 120. Therefore, when frame $f_n$ and frame $f_n^2$ are shown in an alternating fashion, the visual perception of an observer will be the same perception as frame $f_n'$ in schematic 110. That is, the pixel values at pixel position B and pixel position C will be perceived by a viewer as approximately 50% less than the pixel value for pixel position D as represented in frame $f_n'$ of schematic 110 by line 114. Thus, the block discontinuity at border 112 is smoothed to minimize the blocky effect when a sharp jump at a block boundary is caused by a transition in pixel values.

In another embodiment, the pixel values at boundary 112 can be smoothed by alternately displaying the frames illustrated in schematics 122 and 124. In schematic 122, the initial frame has the pixel value for pixel position B substituted at pixel position C. A second frame defined in schematic 124 where the pixel value for pixel position C has been substituted for pixel position B. It should be appreciated that by presenting the frames represented by schematics 122 and 124, in an alternating mode, an observer will similarly see the frame $f_n'$ illustrated in schematic 110, where the pixel value at boundary 112 of pixel B and pixel C is approximately 50% of the pixel value of pixel D. It will be apparent to one skilled in the art that any gray shade can be achieved here by altering the number of frames. In one embodiment, as long as a dither matrix is large enough, the number of gray shades is equal to the rank of the dither matrix.

Figure 4:
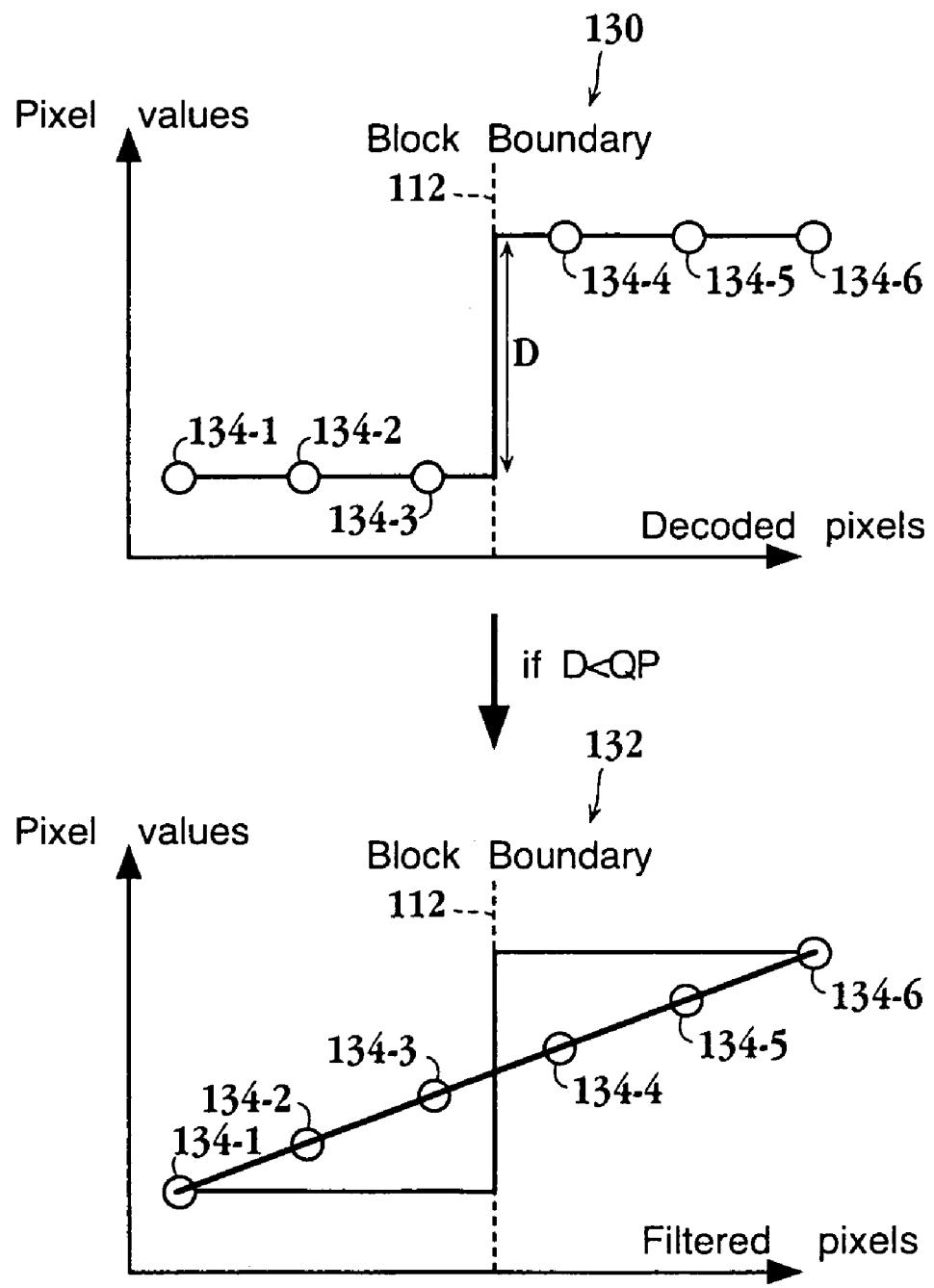
FIG. 4 is a graphical representation of the smoothing effect on blocking artifacts at a block boundary.

FIG. 4 is a graphical representation of the smoothing effect on blocking artifacts at a block boundary. Schematic 130 illustrates the pixel values for a first block having pixels 134-1 through 134-3 compared to the pixels of a second block having pixels 134-4 to 134-6. In one embodiment, decoded pixels 134-1 through 134-6 can be averaged, i.e., smoothed so that the blocky artifact is minimized, as will be explained in further detail with reference to FIGS. 6 and 7. Thus, the sharp transition at block boundary 112 is changed to a gradual transition to reduce blocking artifacts. In one embodiment, the decoded pixels are only filtered as described in the embodiments herein, if the difference (D) is less than the quantization parameter (QP). If the difference (D) is greater than or equal to the QP, the sharp transition at block boundary 112 is regarded as a real edge, thus filtering using frame rate modulation is not performed. One skilled in the art will appreciate that the quantization parameter is set in the encoding stage.

Figure 5:
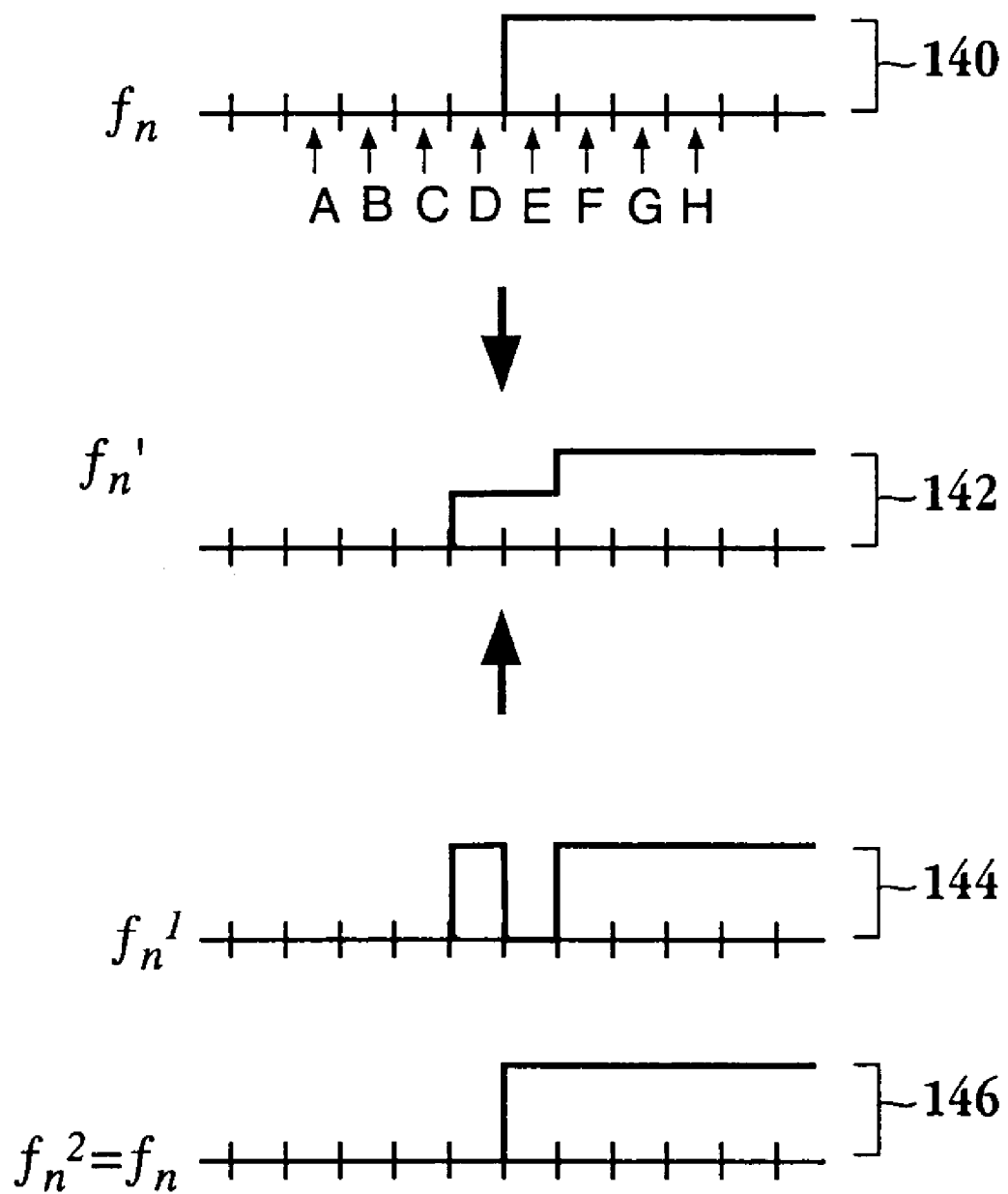
FIG. 5 is another one-dimensional graphical representation of one of the embodiments of FIG. 3.

FIG. 5 is another one-dimensional graphical representation of one of the embodiments of FIG. 3. Here, the frame rate modulation discussed above is used to smooth the discontinuities i.e., blocking artifacts, occurring between the location of pixels D and E of original frame $f_n$ 140. The smooth block boundary illustrated in frame $f_n'$ 142 is achieved by alternately displaying frame $f_n^1$ 144 and $f_n^2$ 146. It should be appreciated that $f_n^1$ has the boundary pixel values for pixels D and E swapped, while $f_n^2$ 146 is the original blocky signal $f_n$ 140. Due to the time averaging achieved by the alternate displaying of $f_n^1$ 144 and $f_n^2$ 146 the resulting image $f_n'$ 142 is visually the same as a low pass filtered image with pixel values for pixel positions D and E both being averaged. Thus, the frame rate modulation described herein eliminates the timely and tedious spatial domain low pass filtering while achieving the same results visually.

Figure 6:
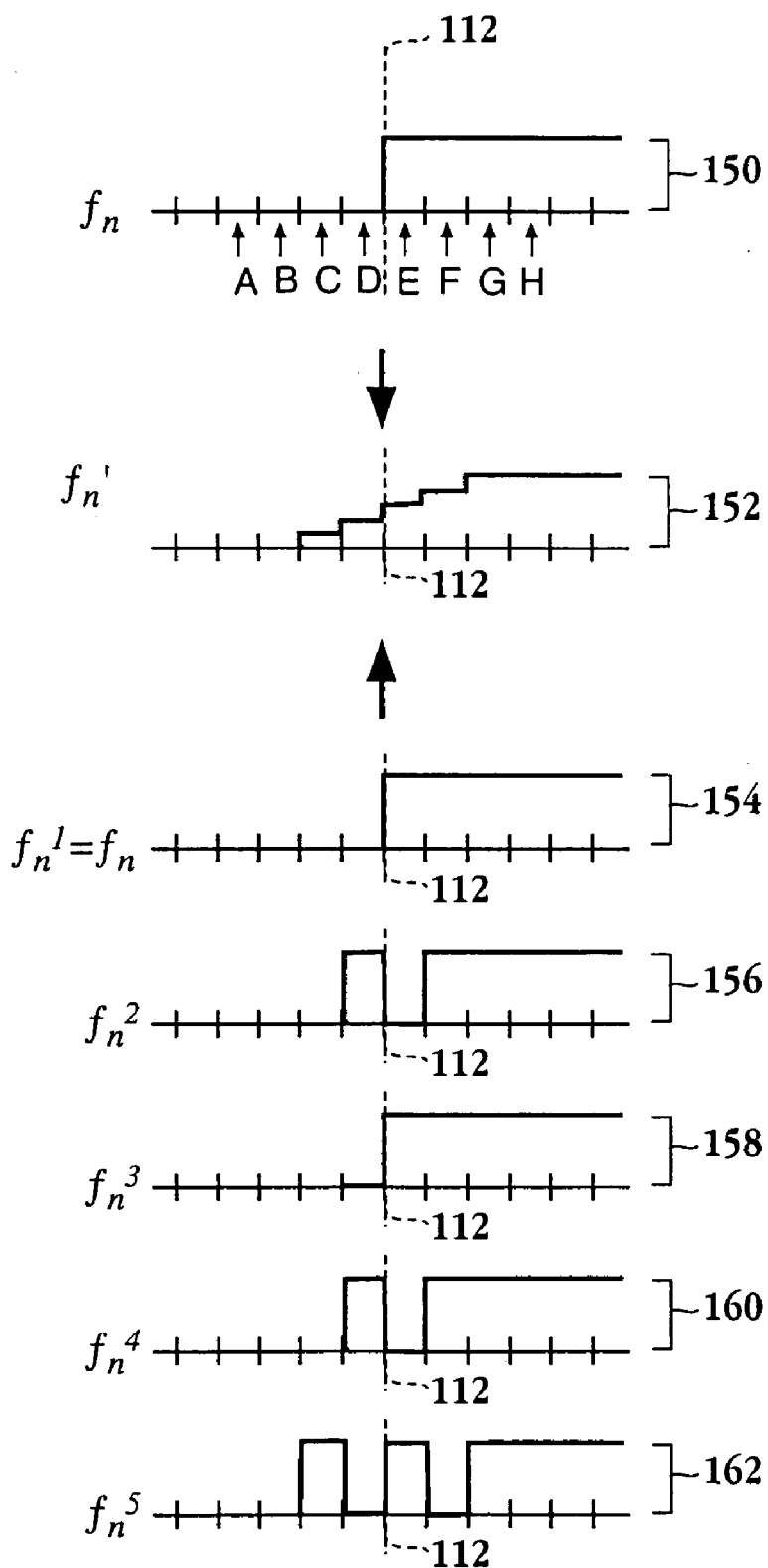
FIG. 6 is a one-dimensional graphical representation of a scheme for minimizing blocking artifacts using frame rate modulation having the effect of a five tap low pass filter in accordance with one embodiment in the invention.

FIG. 6 is a one-dimensional graphical representation of a scheme for minimizing blocking artifacts using frame rate modulation having the effect of a five tap low pass filter in accordance with one embodiment in the invention. Here, blocky signal $f_n$ 150 having a blocking artifact at boundary 112 is smoothed as represented by frame $f_n'$ 152. In this embodiment, the original frame $f_n^1$ 154 is alternately displayed with four additional frames. The four additional frames, $f_n^2$ 156, $f_n^3$ 158, $f_n^4$ 160 and $f_n^5$ 162 modify the pixel values around block border 112 so as to provide a perceived smoothed boundary by a viewer, when the frames are being displayed in an alternating mode. One skilled in the art will appreciate that any number of suitable modifications can be made to the frames in order to achieve the desired visual effect of a smoothed block boundary. That is, while FIG. 6 illustrates the transition occurring between pixel position B and pixel position G occurring in 20% increments, any suitable percentage increment can be achieved by altering the number and the configuration of additional frames being shown. In addition, while four pixel positions (C-F) were selected to be smoothed in FIG. 6, any suitable number of pixel positions can be selected to be smoothed. Of course, real edges are prevented from being smoothed by measuring a difference between pixel values at the block boundary and comparing that difference to the quantization parameter. If the difference is greater than the quantization parameter then the filtering described herein is not performed as discussed with reference to FIG. 4.

Figure 7:
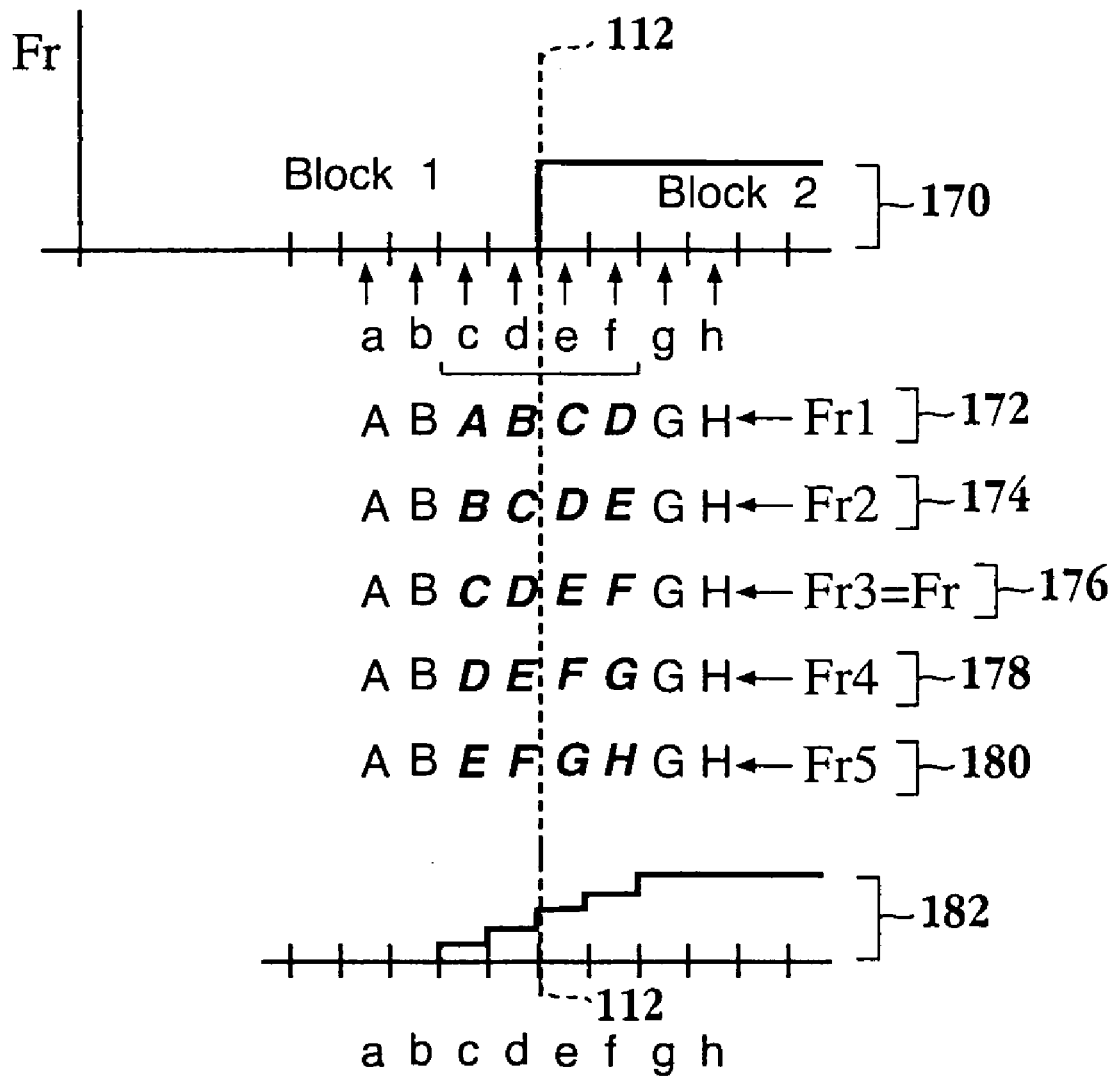
FIG. 7 is a one-dimensional graphical representation providing a generalization of deblocking using frame rate modulation in accordance with one embodiment of the invention.

FIG. 7 is a one-dimensional graphical representation providing a generalization of deblocking using frame rate modulation in accordance with one embodiment of the invention. Frame (Fr) 170 illustrates the original blocky signal. Block 1 includes pixel positions a, b, c, and d. Block 2 includes pixel positions e, f, g, and h. It should be appreciated that the pixel values are represented by the upper case letters of the pixel position. For example, pixel position a has a pixel value of A, pixel position b has a pixel value of B, and so on. Equation 184 represents the generalization of a n-tap filter in one embodiment of the invention. Parameter N represents the sum of the value in the braces of equation 184. In one embodiment, the user can choose the pixel positions to be blurred, i.e., smoothed. For exemplary purposes, pixel positions c, d, e, and f have been chosen to be smoothed with reference to FIG. 7, however, more or less pixel positions may be chosen. Additionally, for illustrative purposes, the generalization of deblocking using frame rate modulation is discussed in terms of a five tap filter. Thus, each selected pixel is averaged by n=5 pixels and the number of frames to be inserted is calculated as N−1, which equals 4 here. That is, four additional frames are inserted in addition to the original frame. The four additional frames are Frame 1 172, Frame 2 174, Frame 4 178 and Frame 5 180. The original frame is represented by Frame 3 176.

Still referring to FIG. 7, each of frames 1-5, 172-180, have pixel values associated with the representative pixel position. However, the pixel values associated with pixel positions that were selected to be smoothed have been modified. Thus, the pixel values associated with pixel position c are now A, B, C, D and E. Accordingly, pixel position c is associated with a value that consists of an average of five different pixel values. Likewise, pixel values associated with pixel position d are B, C, D, E and F. As can be seen, pixel positions E and F also have modified pixel values. Of course, any type of averaging can be used, such as a weighted average placing more weight on a particular pixel value. It should be appreciated that by displaying frames 1-5, 172-180, in an alternating fashion, the sharp transition at boundary 112 is visually perceived to a viewer as a gradual transition. The visually smoothed boundary is one-dimensionally illustrated by graph 182 of FIG. 7. Consequently, when N equals 5, the low pass filtered value for pixel position c is equivalent to (A+B+C+D+E)/5. One skilled in the art will appreciate that this is equivalent to displaying A, B, C, D, and E alternatively in the time domain. The same holds true for the filtered values for pixel positions d, e, f. In other words, if the pixel values associated with block 1 are considered zero and the pixel values associated with block 2 are considered 1, then the pixel value associated with each of pixel positions a and b of graph 182 is zero. While the pixel value associated with pixel position c is 1 divided by 5, which is 0.2, i.e., 20% of the pixel value associated with the pixels of block 2, and the pixel value associated with pixel d is two divided by five which is 40%. Similarly, the pixel value associated with pixel position e would be 60% or the pixel value associated with pixel position f is 80%. Therefore, a smoother transition is perceived at block boundary 112 rather than a sharp transition from zero to 100%. In essence, the transition steps in 20% increments from zero to 1.

Figure 8:
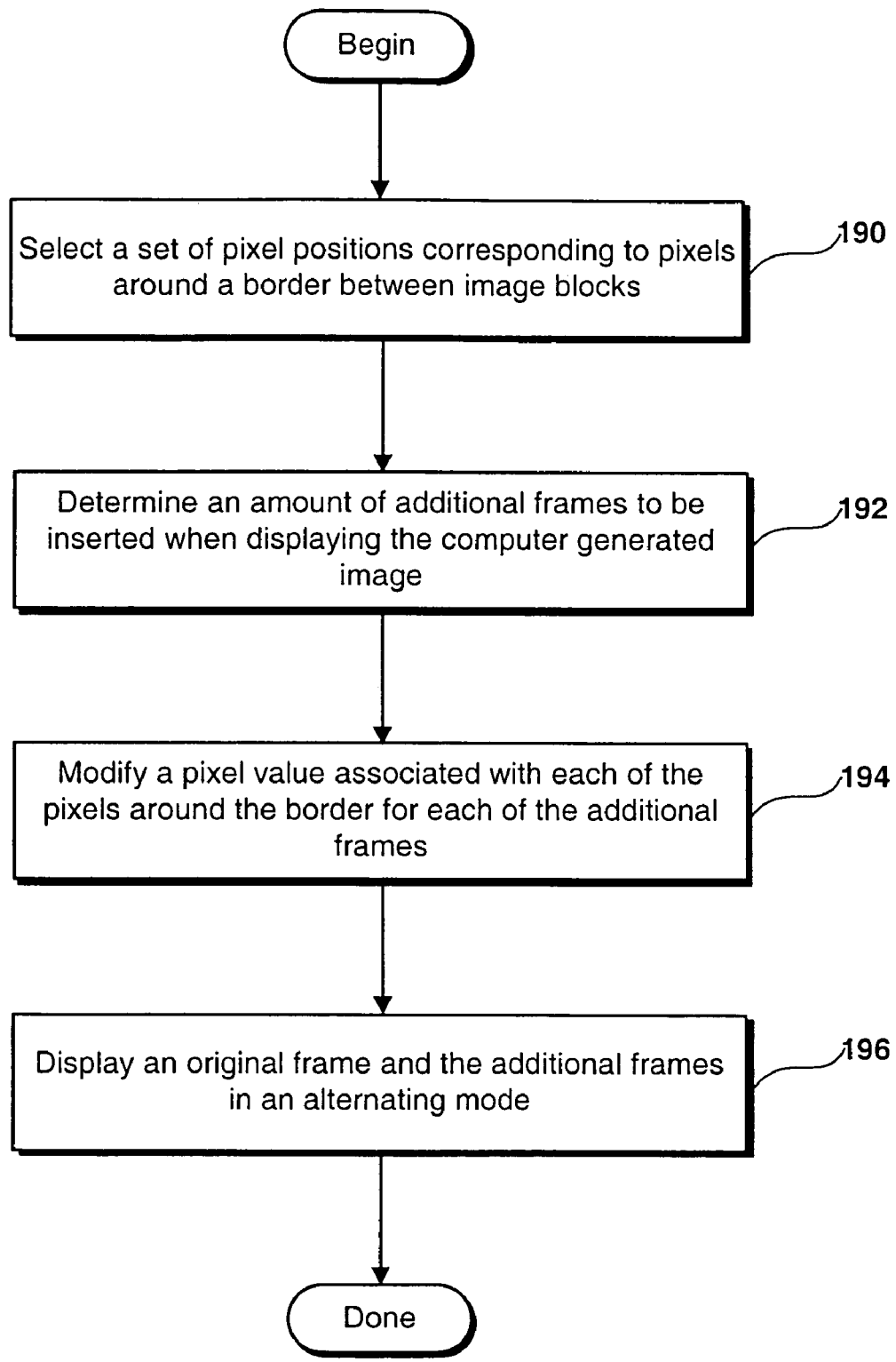
FIG. 8 is a flow chart diagram of the method operations for reducing blocked artifacts between image blocks of a decompressed image in accordance with one embodiment of the invention.

FIG. 8 is a flow chart diagram of the method operations for reducing blocked artifacts between image blocks of a decompressed image in accordance with one embodiment of the invention. The method initiates with operation 190 where a set of pixel positions is selected. The pixel positions correspond to pixels proximate to a border between adjacent image blocks. Here, the pixel positions could be the two adjacent pixel positions on either side of the block boundary as illustrated with reference to FIG. 5. Alternatively, the pixel positions could be a plurality of pixels on each side of the block boundary, such as the illustrations discussed with reference to FIGS. 6 and 7. The method then advances to operation 192 where an amount of additional frames to be inserted into a display pattern is determined. In one embodiment, where each of the filter coefficients is equally weighted, the amount of additional frames to be inserted in the display pattern is equal to one less than the number of filter coefficients, i.e., one less than the filter tap.

The method of FIG. 8 then proceeds to operation 194, where a pixel value associated with each of the pixels proximate to the border for each of the additional frames is modified. In one embodiment, the pixel values are manipulated through frame rate modulation as described above. For example, the pixel values can be modified so that a gradual step pattern is provided in the region proximate to a block boundary as described with reference to FIGS. 6 and 7. In another embodiment, the pixel value of two pixel positions, where each pixel is on opposed sides of a block boundary can be swapped or flipped as illustrated with reference to FIG. 5. In yet another embodiment, the pixel values are modified after it has been determined that a difference between the values of the decoded pixels from a first block and the values of decoded pixels from a second block is less than the quantization parameter. The method then moves to operation 196 where an original frame and the additional frames are displayed in an alternating mode. Thus, where one additional frame is inserted, such as discussed with reference to FIG. 5, each frame is shown in an alternating fashion to reduce block artifacts by providing a more gradual transition for differences in pixel values at the block boundary. That is, a boundary pixel is energized every other frame to provide a perception of a 50% pixel value in this embodiment. It should be appreciated that the embodiments described herein may apply to the entire block boundary. For example, where a block is bordered by four other blocks on each side, the pixel averaging or pixel swapping described herein may be applied to selected pixels at each side, i.e. each block boundary.

Figure 9:
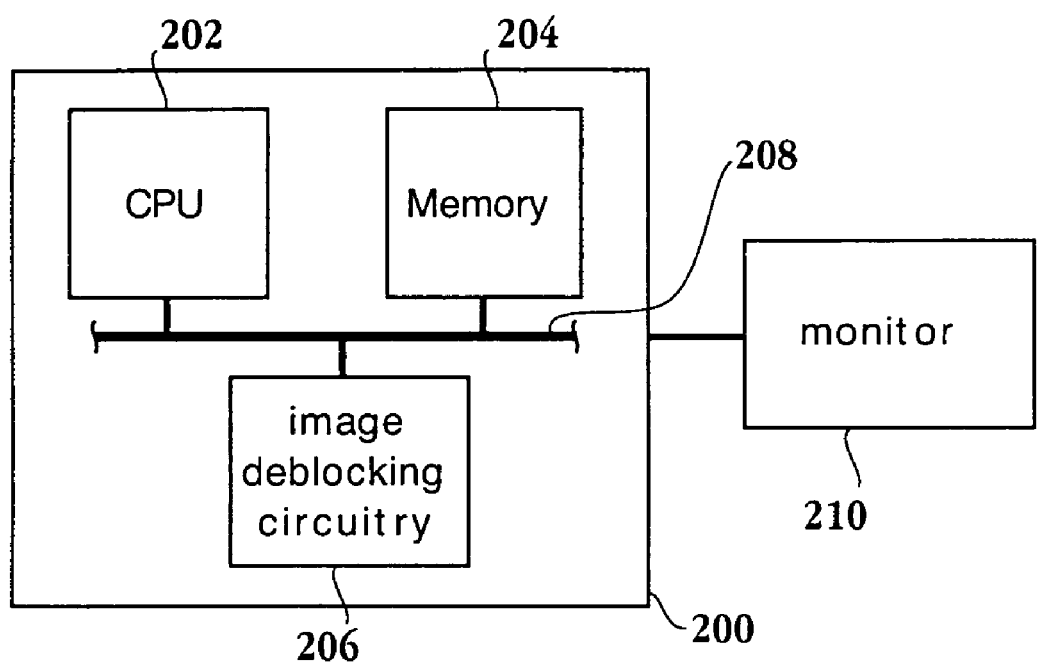
FIG. 9 is a simplified schematic of a device having image deblocking circuitry in accordance with one embodiment of the invention.

FIG. 9 is a simplified schematic of a device having image deblocking circuitry in accordance with one embodiment of the invention. Device 200 includes CPU 202 which is in communication with memory 204 and image deblocking circuitry 206 through bus 208. Device 200 displays an image on monitor 210. Of course, monitor 210 can either be an integral part of device 200 or a stand alone unit. Where device 200 is a mobile terminal, such as a cellular phone, web tablet, personal digital assistant, etc., image deblocking circuitry 206 is configured to reduce a blocky effect of an image being presented on monitor 210 while minimizing the power consumed. In one embodiment, deblocking circuitry 206 smoothes a border between image blocks of a frame of image data as discussed above with reference to FIGS. 3-8. For example, deblocking circuitry 206 may be configured to average pixel values proximate to a border between image blocks by alternately displaying an original frame of image data with additional frames of image data, wherein the additional frames of image data have altered pixel values proximate to the border between image blocks. That is, the frame rate modulation discussed above is executed through deblocking circuitry 206 to minimize blocking artifacts of an image being displayed. One skilled in the art will appreciate that device 200 may be configured to be attached to a storage device, such as a hard drive, networked attached storage, etc. Alternatively, device 200 may be configured to download image data from a distributed network, such as the Internet. In another embodiment, the image deblocking circuitry is located on a printed circuit board, such as a host bus adapter card.

In summary, the above described invention provides for a method and system for minimizing a blocky effect due to the transition of pixel values across block boundaries. In one embodiment, the pixel values of pixels positioned at opposite sides of a block boundary are swapped to define an additional frame. The additional frame is alternately displayed with an original frame to smooth a blocking artifact. The alternate display of the original and the additional frame is also referred to herein as frame rate modulation. Frame rate modulation provides a display that has reduced block artifacts. In another embodiment, a number of pixel positions on each side of a block boundary are swapped to define one or more additional frames. Here again, the one or more additional frames and the original frame are alternately displayed to minimize any blocky effect. However, where a true edge is defined at the block boundary, the smoothing algorithm is not performed.

In one embodiment, a true edge is determined by a difference between the values of the decoded pixels from a first block and the values of decoded pixels from a second block, where the difference is compared to a quantization parameter set in the encoding stage. More particularly, where the difference in pixel values is greater than the quantization parameter, a true edge occurs at the block boundary, therefore, the smoothing algorithm is not performed in this instance. It should be appreciated that the embodiments described herein reduce blocking artifacts between image blocks without blurring real edges and without tedious low pass filtering in the spatial domain. Thus, for mobile media terminals and devices using embedded systems, where computing power is a higher priority than the quality of the decoded signal, the above described embodiments provide an acceptable picture quality that reduces blocking artifacts while conserving power.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A frame rate modulation method for filtering discontinuities at a boundary between adjacent blocks of a frame of a video image performed using logic on an integrated circuit chip, comprising:

a) identifying adjacent pixels located on each side of a boundary between adjacent blocks of a first frame of a video image, each of the adjacent pixels being associated with a pixel value, using the logic on the integrated circuit chip;

b) determining a difference between the adjacent blocks based on the pixel values of the adjacent pixels, using the logic on the integrated circuit chip;

c) if a difference between adjacent image blocks of the first frame is less than a quantization parameter, then the method includes defining a second frame having the pixel value for each of the adjacent pixels swapped; and averaging the pixel value associated with each adjacent pixel by alternately displaying the pixel value associated with each adjacent pixel to present an image having a smoothed block boundary, using the logic on the integrated circuit chip.

2. The method of claim 1, further including performing operations a, b and c for each boundary pixel of a block of a frame of a video image.

3. The method of claim 1, wherein the method operation of averaging the pixel value associated with each adjacent pixel by alternately displaying the pixel value associated with each adjacent pixel to present an image having a smoothed block boundary includes energizing the pixel value for each of the adjacent pixels every other frame.

4. An apparatus for performing the method of claim 1.

5. A computer readable medium containing a set of instructions, which, when executed by an instruction-readable device, is configured to perform the method of claim 1.

\* \* \* \* \*